Sept. 8, 1953     A. J. DÉVOT     2,651,752
ELECTRICAL FAULT FINDER
Filed Jan. 7, 1948     3 Sheets-Sheet 1

INVENTOR
André J. Dévot
BY
HIS ATTORNEY

Sept. 8, 1953  A. J. DÉVOT  2,651,752
ELECTRICAL FAULT FINDER
Filed Jan. 7, 1948  3 Sheets-Sheet 2

INVENTOR
André J. Dévot
BY
HIS ATTORNEY

Sept. 8, 1953     A. J. DÉVOT     2,651,752
ELECTRICAL FAULT FINDER
Filed Jan. 7, 1948     3 Sheets-Sheet 3

INVENTOR
André J. Dévot
BY
HIS ATTORNEY

Patented Sept. 8, 1953

2,651,752

UNITED STATES PATENT OFFICE 2,651,752

ELECTRICAL FAULT FINDER

André J. Dévot, Canton, Mass., assignor to Tobe Deutschmann Corporation, Canton, Mass., a corporation of Delaware Application January 7, 1948, Serial No. 997

13 Claims. (Cl. 324—52)

The present invention relates to an electrical fault finder for locating the position of faults on electrical lines and cables. Electrical faults may be in the nature of circuit grounds, a break in the circuit, or change of circuit characteristics of such a nature as to affect the efficiency of power transmission, of signal or speech transmission, or the operation of the circuit for other uses.

Various systems and devices have been developed for the location of electric faults on lines, including resistance and inductive measurements. In the present invention, results are accomplished through means employing a short, in fact an ultra short, electric pulse which is transmitted down the line from a given point of observation and in which the time of travel necessary for the pulse to reach the fault and be reflected back in the vicinity of the point of origin is measured to indicate the length on the line to where the fault occurs.

In the present system, a measuring standard is set up by timing circuits, the operation of which is initiated with the transmission of a short pulse sent down the line. This measuring circuit includes means for providing suitable measuring markers on a cathode ray oscilloscope tube on which the faults are visibly indicated by means of peaks formed by the beam in the tube and read in relation to the marking points.

The present invention may be used to locate faults on many kinds of lines and cables of greatly varying lengths and to locate the position of the fault accurately. It is possible also to determine whether the fault is of an open or short circuit nature or merely a change in the constants of the circuit.

Further advantages and improvements provided by the present invention will be more clearly understood from the description of an embodiment of the invention in the specification annexed hereto, in which Fig. 1 shows a block diagram of the circuit employed;

Figure 1:
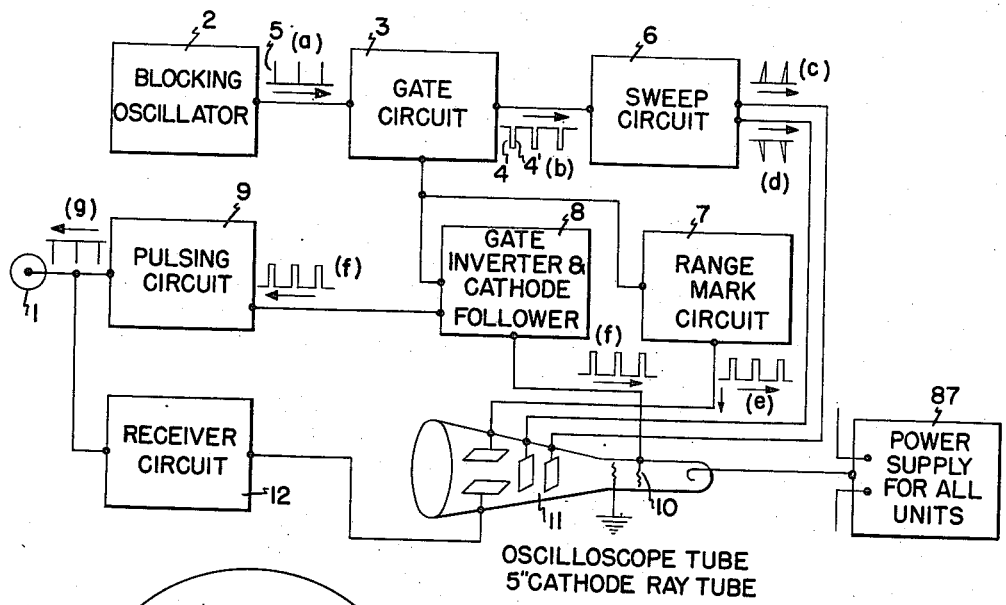
Figure 2:
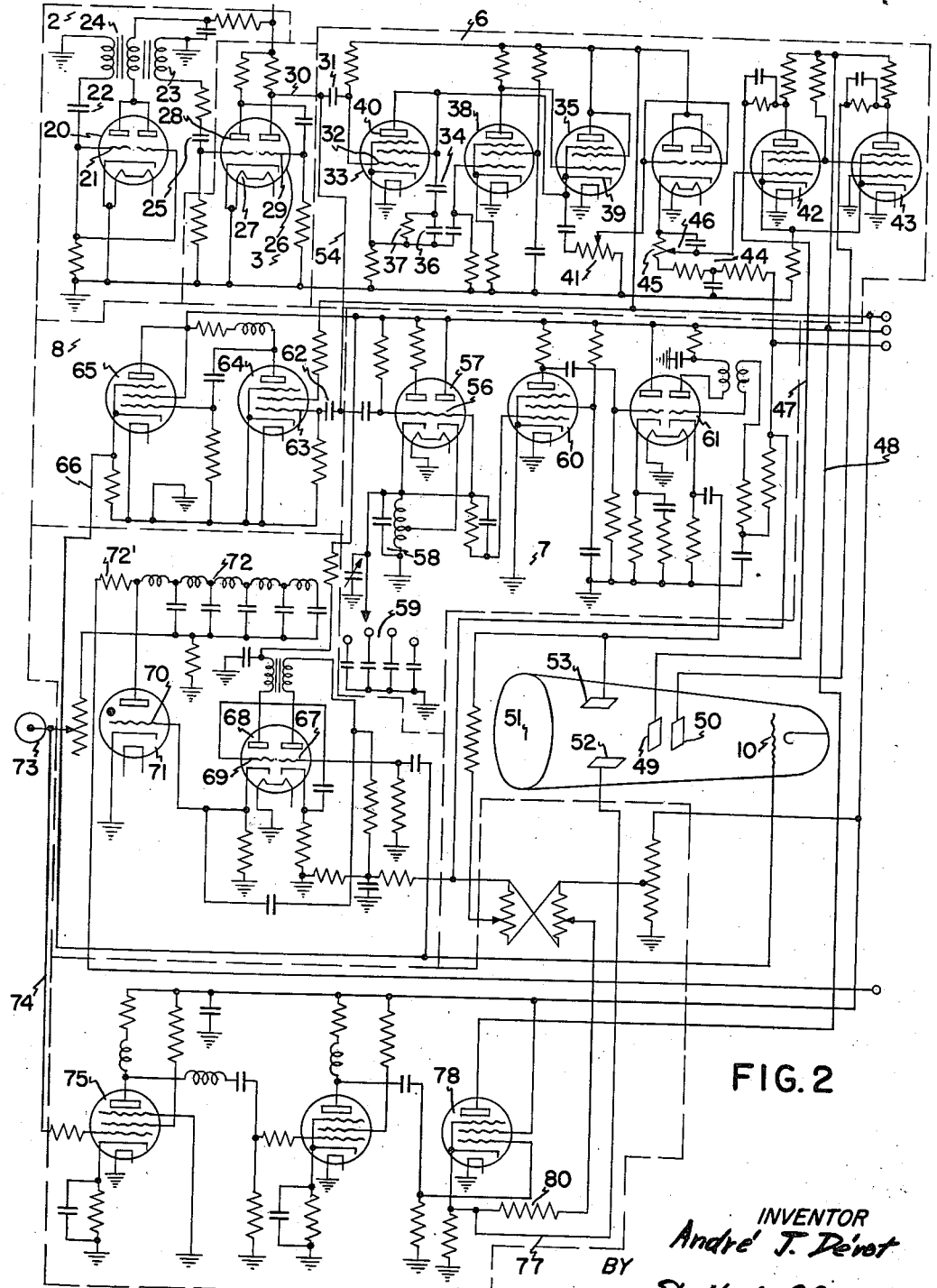
Fig. 2 shows a schematic diagram of the circuit shown in block in Fig. 1.

In Figs. 1 and 2, 1 indicates a line under test, which may be a multiconductor cable, a concentric cable, single power or signalling line, multiple power or signalling lines, or, in fact, any type of line circuits or continuing network in which a considerable extent of line is employed and is to be tested for electrical fault. The range of the apparatus may be made to extend as high as 40 or 50 miles or even higher.

Figure 3:
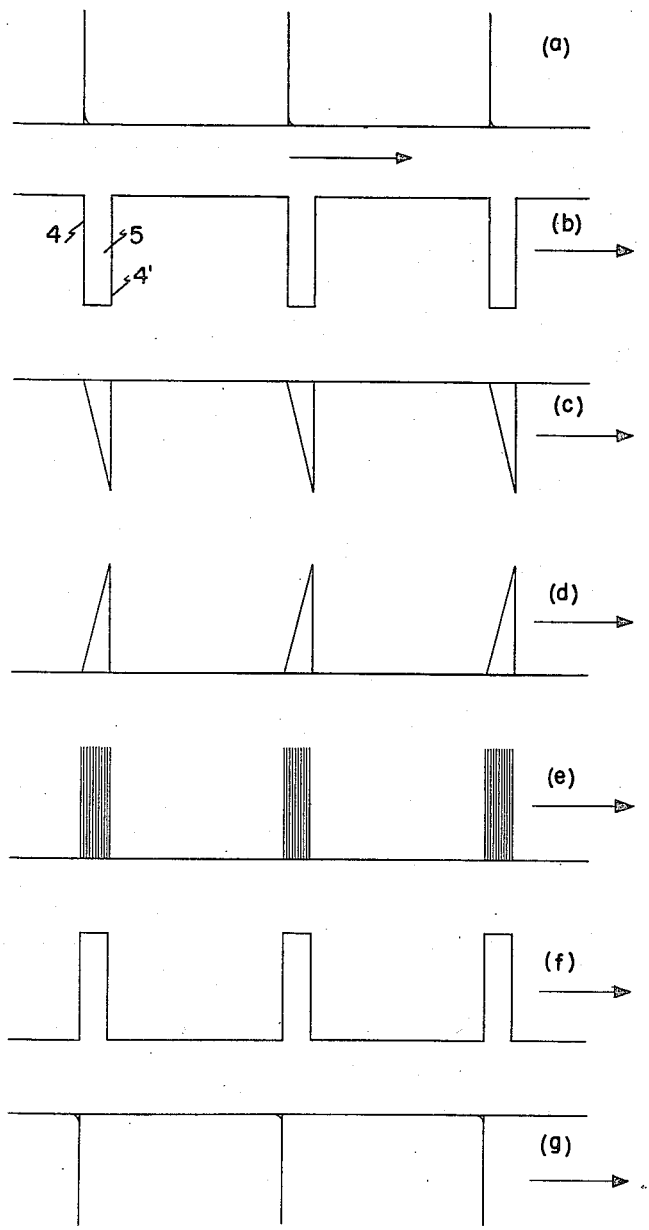
Fig. 3 shows a series of curves indicating the function of the various units in the circuit.

Referring initially to Fig. 1 in connection with the curves of Fig. 3, the system may be controlled or set in operation by a blocking oscillator 2, which may have a repetition rate of somewhere in the neighborhood of 400 to 600 cycles per second. The function of this blocking oscillator is to produce a sharp peak as indicated by the curve $a$ (Fig. 3), in which the peaks are of the order in width of one microsecond, and spaced about 1/400 of a second apart where the repetition rate is 400 cycles per second. The blocking oscillator which, as noted, controls the repetition rate of the system is connected to a so-called "gate" circuit 3, whose function is to produce a square topped wave as indicated by the curve $b$, the forward side 4 of which corresponds in time to the vertical line of the blocking peaks of the curve $a$. The gate circuit provides a negative square waved pulse, the width of which covers the time interval of one entire measuring operation. The gate width 5 of wave $b$ (Fig. 3) is made sufficiently wide, therefore, for whatever range of measurements for which the device is to be used. If the device is to cover a range of 40 miles, the gate width 5 will then, of course, be double the range for 20 miles, for example. The gate circuit 3 operates or controls three unit circuits, the sweep circuit 6, the range mark circuit 7, and a so-called gate inverter and cathode follower circuit 8, the function of the latter being to invert the gate pulse from a negative to a positive wave or signal as indicated by the curves $f$ (Figs. 1 and 3). The positive gate ouput is fed to the pulsing circuit 9 and to the intensifier grid 10 of the oscilloscope tube 11.

A receiving circuit 12 is connected with the line to receive the direct and reflected pulses, while the output of the receiver is connected to the control element of the oscilloscope tube 11 to indicate the reflected signal in its proper time related position.

The ouput of the gate circuit which is impressed upon the sweep circuit 6 functions to start the operation of the sweep circuit at an instant corresponding to the forward line 4 of the gate wave in the curve $b$, and to stop the operation of the sweep circuit at the other side, 4', of the gate wave curve. As a result, the output of the sweep circuit indicated by the curves $c$ and $d$ each has a width the same as the width 5 of gate curve b for both the positive and negative sweep pulses c and d, respectively. The positive and negative of the sweep pulse outputs permit a convenient means of centering of the cathode beam travel across the tube. This is obtained by constructing the sweep circuit with a push-pull output, which produces the positive and negative sweep waves.

The negative gate output b, when impressed upon the range mark circuit 7, produces an output curve e comprising a series of range mark peaks which mark off or divide the time width 5 of the gate circuit output uniformly. The divisions, for instance, may correspond to distances of a mile or a half mile. Ten such marks, at a distance corresponding to a mile apart, would give a measurement rate of 10 miles, which on open wire equals a time interval of 109.2 microseconds. This means that the gate width 5, under such conditions, will correspond to such a time interval. The curve f of the output of the gate invertor is the same as the curve b with the exception that the curves are positive instead of negative. When the positive gate wave is impressed upon the pulsing circuit, sharp peaked pulses are produced in the output of the pulsing circuit, each pulse beginning with the forward end of the positive gate and closing very sharply to make a peaked pulse long before the end of the gate pulse, preferably a fraction of a microsecond after beginning. Such a peaked pulse may, if desired, be produced at substantially high voltage so as to ionize or arc the fault in the circuit in order to maintain the low resistance characteristic fault of the circuit. This will be discussed more fully in other parts of the specification, and the same effect may be obtained by means described in connection with Fig. 5.

Referring more particularly to the circuit diagram of Fig. 2, the section 2 enclosed by dotted lines shows the blocking oscillator corresponding to the block diagram of Fig. 1.

As indicated by the diagram, this may be operated with a triode tube 20. In this circuit, an initial positive potential impressed upon the grid 21 rapidly produces a negative potential through the charging of the condenser 22 to cut off the tube conduction and produce a sharp peaked curve. The frequency of repetition is regulated by the time it takes for the condenser 22 to discharge to permit the tube to become conductive again. The output of the blocking oscillator curve a (Fig. 1), provided through the secondary 23 of the transformer 24, is impressed through the condenser 25 on the gate circuit 26, which may also be a double triode tube or two individual tubes, if desired.

In the gate circuit 2, current normally flows between the cathode 27 and the anode 28. When, however, the positive pulse from the blocking oscillator is impressed upon the grid 29, the grid takes over, acting to cut off the current between the cathode 27 and the anode 28, thereby permitting the other half of the tube to become conductive until the charge has leaked off the grid 29 through the discharge of the condenser 25. The pulse obtained from the gating tube circuit in the form shown in curve b is impressed through the output line 30 on the sweep circuit 6, the gate inverter 8, and the range marking circuit 7. The sweep circuit 6 receives the gate pulse through a condenser 31 which is connected to the grid 32 of the input tube 33 of the sweep circuit. The forward end of the pulse from the gate circuit cuts off the current flow in the tube 33 and permits the condenser 34 to charge through the tube 35, the cathode of which, in the function of a cathode follower, controls the sweep circuit. An additional condenser 36 and resistance 37 connected together in shunt and series with the condenser 34 sharpen or quicken the building up of the charging or voltage in the initial part of the sweep circuit in order to make this portion of the sweep curve more linear. The rear end of the gate pulse acts to make the tube 33 again conductive, which sharply cuts off the charging of the condenser 34 to end the sweep pulse or bring the voltage back to zero. The sweep pulse, therefore, has the same length as the width of the negative gate. Between the cathode follower tube 35 and the input tube 33 is an amplifier tube 38, which may operate as a class A type and acts to increase the potential effect built up on the cathode follower tube. The cathode 39 of the cathode follower tube 35, it will be noted, is directly connected to the plate 40 of the sweep circuit. The rest of the sweep circuit includes a potentiometer device 41, which acts as an expander for expanding the travel of the cathode beam by regulating the magnitude of the sweep potential as applied to the control plate of the oscilloscope. A centering circuit is also employed in connection with a push-pull amplifier stage involving vacuum tubes 42 and 43. This centering circuit shown at 44 comprises a potentiometer 45 with an adjustable tap 46 which controls the sweep circuit outputs of the tubes 42 and 43, one of which is positive and the other negative, as delivered by the lines 47 and 48 to the two plates 49 and 50 of the oscilloscope tube for sweeping the beam in one linear direction across the face 51 of the tube. The sweep voltage delivered to the oscilloscope tube causes the beam to sweep across the tube in, for instance, a horizontal direction at a rapid rate corresponding to the variation in potential produced by the sweep and to be repeated in accordance with the blocking oscillator control. The rate of the sweep, however, must be adjusted to conform with the travel of the electric pulse over the electric line or network to be tested. As is well known, the velocity of travel of the pulse in the network is of the order of the velocity of light, approximately 186,000 miles per second or less, being somewhat less for the transmission of pulses over lines or cables than in free space because of the retardation effects of the line. The sweep of the beam across the face of the cathode ray oscilloscope, if made to correspond to a time measurement having a ten mile line, will be of the order of 109.2 microseconds for a typical open wire line.

This time interval itself is extremely short, but by means of the present invention range marking pips are impressed upon the beam to indicate intermediate distances on the face of the cathode ray tube. These range marking pips are obtained by pulse voltages impressed upon the other plates 52 and 53 of the cathode ray tube. If the plates 49 and 50 produce a horizontal travel of the beam, the plates 52 and 53 will cause a vertical travel and corresponding mark of the beam. The range marking circuit is enclosed within the area 7. This circuit receives the negative gate wave over the line 54, which connects through the condenser 55 to the grid 56 of the double triode 57. The grid 56 of the tube 57 cuts off at the forward end of the gate pulse, permitting the other half of the triode or independent tube (if one is used) to oscillate with the circuit 58 acting to control the rate of oscillations through the remaining operating portion of the gate interval. Vernier controls are obtained through the circuit 59 by which the oscillating period may be accurately adjusted. The first of the oscillations produced in the output of the tube 57 is therefore synchronized with the initial operation of the gate pulse. The frequency is continuously variable in the nature of 40 to 70 kilocycles for one mile markers on cables and two mile markers for open wire lines. These oscillations may be passed through an amplifier stage including the tube 60 from which they are impressed on a blocking oscillator circuit including the tube 61, which is similar to the blocking oscillator previously described, inasmuch as each oscillator is peaked to a point in the output of the tube 61, which is connected with the plates 52 and 53, the latter through ground of the cathode ray tube.

The forward end of the gate wave commences the operation of the range marking circuit, thereby producing the range marking pulses, while the rear side of the gate wave sharply cuts these marking pulses off, so that for each gate wave a certain number of range marking pulses are produced. The frequency of oscillation in the range marking circuit may be such that the marking pulses are set up for a half mile or for every mile, if desired, or for some different magnitude. The range marking pulses act to cause the beam to travel transversely to its normal travel in its sweep across the tube. Since the sweep circuit is expanded or contracted through control of the sweep itself, the range marking pips will also be expanded or contracted by the same means. Their position is, therefore, always relatively correct with that of the sweep circuit.

In addition to the elements which have been described, two other circuits are synchronized with the gate circuit but through the gate invertor, which converts the negative gate pulse output to a positive pulse as already mentioned and shown in curve f. The gate invertor which serves this purpose receives the negative gate input over the line 54 and condenser 62, through which the negative pulse is impressed upon the grid 63 of the tube 64. The tube 65 in the gate circuit acts as a cathode follower with the tube 64 to produce a positive pulse corresponding to the negative pulse over the output line 66. This positive pulse is impressed on the pulsing circuit and on the intensifier or suppressor grid 10 of the oscilloscope tube 11.

The positive pulse output 66 from the gate invertor is also fed to the pulsing circuit which takes the pulse in on the grid 67 of the tube 68, which is a double triode tube producing a pulse similar to that of the blocking oscillator, but with a shorter time duration. The forward edge of the positive pulse produces a sharp current flow with corresponding reaction on the cathode follower grid 69 to cut off the pulse. The grid 70 of the hydrogen gaseous discharge tube 71, therefore, receives a very sharp positive pulse which fires the discharge tube, which is maintained active by the fixed line section 72 for a time interval corresponding to the travel of a pulse to the end of the fixed line and return. By that time the line has discharged and the tube is extinguished. The pulse line is charged up through a high resistance 72' which with the line forms a comparatively slow time circuit, the resistance preventing rapid recharging. The length of the line 72 controls the duration of the pulse. This may be short, of the order of .5 of a microsecond, or considerably longer where desired.

The pulse transmitted over the cable or network 73 to be tested is picked up, after reflection from the point of failure therein back to the head of the line or the place where the pulse was first impressed, by the line 74 through which the reflected pulse together with the direct pulse is impressed on the first receiver tube 75.

The receiver circuit, which may be omitted only if the reflected pulse has sufficient energy to operate the indicator itself, steps up the reflection through an amplifying and power stage for impressing the input of tube 78 by means of the line upon the plate 52 of the oscilloscope tube. The other vertical plate 53 is connected through the vertical centering potentiometer or network 79 to the same line 77 through a substantial resistance 80.

It will be seen that both the range marking circuit and the receiving circuit impress their inputs across the same control plates or elements of the cathode ray tube. Each functions to produce pips or serrations in the cathode beam image on the screen transverse to the normal course of the beam controlled by the sweep circuit.

Figure 4:
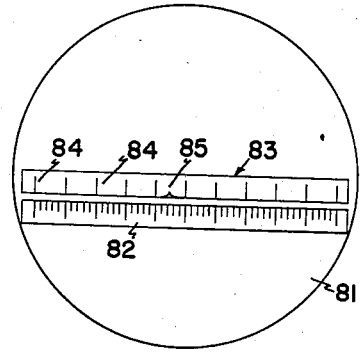
Fig. 4 shows the face of the cathode ray oscilloscope with indication shown.

Since the pulse impressed upon the grid 10 of the cathode tube is positive, the beam is intensified during the gate circuit interval and suppressed during the rest of the interval in which conditions are established for the next operation. Since the screen of the cathode ray tube has a persistence and since the whole operation is repeated 400 to 600 times per second, the positions of the pips and range marks are stationary and visible and may be easily read. This is indicated in Fig. 4, where 81 is the face of the cathode ray tube oscilloscope, 82 is a marking scale or rule calibrated in distance if desired, and 83 shows the trace of the cathode beam. The pips or marks 84, 84 etc. represent the range marks produced by the beam, while the mark 85 represents the reflected echo received from the receiver. It will be seen that the distance of the fault on the line may be read off directly in distance.

Figure 5:
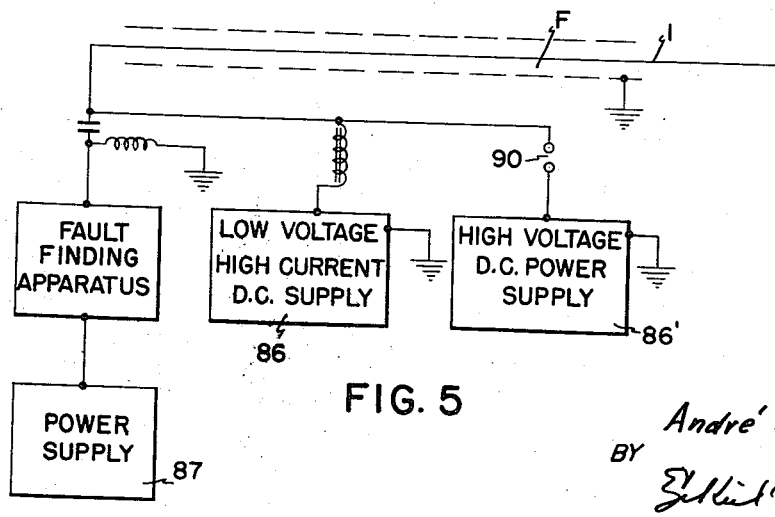
Fig. 5 shows a detail for maintaining certain desirable conditions in a line under test.

In the circuit of Fig. 5, a constant D. C. potential is maintained on the line through a power source 86 of low voltage and high current, which may be separate from the power source 87 for energizing the rest of the system. The purpose of this separate power source 86 is to provide a potential such that an arc produced by the fault under ordinary operation will be maintained under test. It is preferable, however, to have an additional high voltage D. C. source which may have a low amperage capacity for discharging a high voltage across the gap 90 to produce an arc at the fault F which will be maintained by the low power source 86. Where an arc has occurred, it often happens that when the power is removed the fault will be a high resistance rather than a low one, making it difficult to find the fault, particularly where the break is from line to ground which normally is a high resistance. The line is therefore maintained under a potential during test sufficient to provide simulated operating conditions under which the fault occurs. The pulse then sent down the line will be more readily reflected.

Having now described my invention, I claim:

1. A system for locating a fault on an electrical line comprising means for producing a square topped electric pulse of desired duration and frequency, the forward side of the pulse marking the initiation of operation and the rearward side marking the termination of operation, a sweep circuit means, a range marking circuit means for producing a number of marking peaked waves spaced uniformly with the initial peak corresponding to the initiation of operation, each of said means being connected to said first named means, a cathode ray oscilloscope tube having a cathode ray beam with means for controlling the movement thereof, a receiving circuit connected to said line for receiving the reflected pulses from the line, means connecting said sweep circuit to said tube for moving the beam across the tube, and means connecting said range circuit and receiving circuit each to said cathode ray tube for moving the beam transverse to the previous mentioned motion of the beam for producing range marks and location marks of faults.

2. In a system for locating a fault on an electrical line, a visual cathode ray oscilloscope tube having means for producing a linear travel of the beam in diametrically opposite directions, a gate circuit means, a range marker means operatively connected to the cathode ray tube for producing a series of marks with the beam on said cathode ray tube, a pulse producing means connected with said line, a sharp peaked oscillator operatively connected to the gate circuit means, and connecting means between the gate circuit means and the pulse producing means, and the range marker means to start the pulse production and to start and stop respectively the series of marks on the cathode ray tube.

3. In a system for locating a fault on an electrical line, means connected to said line for producing a peaked power pulse of less than a microsecond duration, a cathode ray oscilloscope tube adapted to produce an electron beam made visible by a screen, sweep circuit means connected to said tube for controlling the movement of the beam across the tube as a known function of time, a gate circuit for producing a square topped wave, means connecting the gate circuit to the power pulse means for triggering the power pulse and the beginning of the sweep with the forward end of the square topped wave and ending the sweep with the rear end of the square topped wave.

4. In a system for locating a fault on an electrical line, means for producing a peaked power pulse of less than a microscecond duration, a cathode ray oscilloscope tube adapted to produce an electron beam made visible by a screen, sweep circuit means connected to said tube for controlling the movement of the beam across the tube as a known function of time, range marking means connected to said tube for controlling the beam to produce range marks during its sweep, a gate circuit for producing a square topped wave, means connecting the gate circuit to the power pulse means for triggering the power pulse, the beginning of the sweep, and the range marking means with the forward end of the square topped wave and ending the sweep and operation of the range marking means with the end of the square topped wave.

5. In a system for locating a fault on an electrical line, means for producing a peaked power pulse of less than a microsecond duration, a cathode ray oscilloscope tube adapted to produce an electron beam made visible by a screen, sweep circuit means connected to said tube for controlling the movement of the beam across the tube as a known function of time, range marking means connected to said tube for controlling the beam to produce range marks during its sweep, a gate circuit for producing a square topped wave, means connecting the gate circuit to the power pulse means for triggering the power pulse, the beginning of the sweep, and the range marking means with the forward end fo the square topped wave and ending the sweep and operation of the range marking means with the end of the square topped wave, and means for expanding the travel of the sweep across the tube whereby the distance between range marks may be adjusted.

6. In a system for locating a fault on an electrical line, means for producing a peaked power pulse of less than a microsecond duration, a cathode ray oscilloscope tube adapted to produce an electron beam made visible by a screen, sweep circuit means connected to said tube for controlling the movement of the beam across the tube as a known function of time, range marking means connected to said tube for controlling the beam to produce range marks during its sweep, a gate circuit for producing a square topped wave, means connecting the gate circuit to the power pulse means for triggering the power pulse, the beginning of the sweep, and the range marking means with the forward end of the square topped wave and ending the sweep and operation of the range marking means with the end of the square topped wave, a calibrated scale on the face of the cathode ray tube and means for expanding the travel of the beam to adjust the marking positions to corresponding calibrations of the scale.

7. In a system for locating a fault on an electrical line, potential means for maintaining sufficient direct current power on the line to sustain a fault arc thereon, means for impressing periodic peaked pulses on the line, means connected to the line for receiving the peaked pulses after reflection from the line, a cathode ray tube having means for producing a cathode beam, means operative to control said beam for indicating a time measurement, connecting means from said means operative to control said beam to said receiving circuit whereby said peaked pulses and reflections will produce an indication of a time measurement by operation on said beam.

8. In a system for locating a fault on an electrical line, means for impressing a high voltage low current fault pulse on the line having a magnitude sufficient to arc across the fault, means for maintaining said arc at low voltage, means for periodically impressing a fault locating pulse on the line, means connected to the line for receiving the fault locating pulse after reflection from the line and means, including a cathode ray tube having means for producing a cathode beam and means for controlling the movement of said beam for indicating the time of travel of the last mentioned pulse to the fault arc and reflection back to the point of impression as a location of the position of the fault on the line.

9. In a system for locating a fault on an electrical line, means for impressing a high voltage low current fault pulse on the line sufficient to arc across the fault, means for maintaining said arc of low voltage, means for periodically impressing a fault locating pulse on the line, means connected to the line for receiving the fault locating pulse after reflection from the line, and for indicating the time of travel of the last mentioned pulse to the fault arc and reflection back to the point of impression as a location of the position of the fault on the line, including a cathode ray oscilloscope tube having means for producing a beam, means for repeatedly sweeping said beam across said cathode ray tube, and means operative on said beam to produce indications therewith by which said repeated measurements are indicated and made visible.

10. A system for locating a fault on an electrical line comprising a blocking oscillator for providing spaced electrical pulses of the order of one microsecond at repeated intervals of a substantially lower order of magnitude, gate circuit means operatively controlled by said blocking oscillator for enlarging the time of duration of said pulse, a power pulsing circuit connected thereto and controlled thereby for impressing upon the line connected thereto the fault testing electric pulse, a receiver circuit means having connections to said line for receiving the pulses reflected from the fault on the line at the point of impression, a cathode ray oscilloscope having two pair of deflecting plates, and means for producing and suppressing a cathode ray beam, means connecting the receiver to one pair of deflecting plates, a sweep circuit means operatively connected to and controlled by said gate circuit means and connected to said other pair of plates for sweeping the beam across the oscilloscope, said gate circuit means connected to the means for producing and suppressing said beam for controlling the time interval of operation between successive pulses of the blocking oscillator.

11. A device as in claim 10, in which the gate circuit comprises means for producing a square top wave with the forward side thereof synchronized with the pulse impressed upon the line and the rearward side thereof marking the termination of operation of the system.

12. A device as in claim 10 including a range marking circuit operatively controlled by said gate circuit and connected to the same pair of plates as the receiver circuit for marking individual timing marks corresponding to distance on said cathode ray oscilloscope.

13. In a system for locating a fault on an electric line, a visual cathode ray oscilloscope tube having means for producing a beam, means for producing a linear travel of the beam in diametrically opposite directions, means for producing a travel of the beam at right angles to the linear travel, a gate circuit means, a range marker means operatively included in the means for producing a travel of the beam at right angles to said linear travel for producing a series of marks with the beam on said cathode ray tube, a pulse producing means connected with the said line and sending pulses out on the line, means connected to the line for receiving the pulses after reflection from the line and operatively connected to the oscilloscope for indicating a time measurement, a sharp peaked oscillator operatively connected to the gate circuit means and means connecting the gate circuit means to the range marker means, and operative by the gate circuit wave for commencing the production of marking pulses with the beginning of the gate circuit wave and ending the production with the ending of the gate circuit wave, said means for producing a linear travel of the beam in diametrically opposite directions including a sweep circuit means operatively connected to the gate circuit.

ANDRÉ J. DÉVOT.

References Cited in the file of this patent
UNITED STATES PATENTS

| Number | Name | Date |
| --- | --- | --- |
| 2,108,637 | Bartgis | Feb. 15, 1938 |
| 2,345,932 | Gould | Apr. 4, 1944 |
| 2,407,898 | Norgaard | Sept. 17, 1946 |
| 2,419,620 | Young | Apr. 29, 1947 |
| 2,420,516 | Bischoff | May 13, 1947 |
| 2,426,989 | De Rosa | Sept. 9, 1947 |
| 2,427,523 | Dolberg et al. | Sept. 16, 1947 |
| 2,434,264 | Edson | Jan. 13, 1948 |
| 2,460,688 | Gambrill et al. | Feb. 1, 1949 |